S. A. ELLINGS.
DEVIASCOPE.
APPLICATION FILED JULY 8, 1920.

1,374,142. Patented Apr. 5, 1921.

WITNESSES
INVENTOR
S. A. ELLINGS
BY
ATTORNEYS

UNITED STATES PATENT OFFICE.

SOREN A. ELLINGS, OF NEW YORK, N. Y.

DEVIASCOPE.

1,374,142.

Specification of Letters Patent.  Patented Apr. 5, 1921.

Application filed July 8, 1920. Serial No. 394,674.

*To all whom it may concern:*

Be it known that I, SOREN A. ELLINGS, a citizen of the United States, and a resident of the city of New York, borough of Manhattan, in the county of New York and State of New York, have invented a new and Improved Deviascope, of which the following is a full, clear, and exact description.

This invention relates to improvements in deviascopes, and more particularly to a device which is designed for use as a medium for illustrating compass deviation due to lines of magnetic force in a ship, and also illustrating the manner of correcting such deviation through the employment of ordinary means on the ship.

It is a well-known fact that ships, and particularly steel ships, have a line of magnetic force which varies under certain conditions. Ships, when they are built, or after they have lain in dock for any appreciable length of time, have a line of magnetic force through the ship in direct line with the magnetic pole and this angle of magnetic force causes a deviation in the compass which must be corrected. Other parts of the ship, as for example, the stack and the cargo, and the location of the ship north and south of the Equator and the direction of sailing also have their influence to cause deviation of the compass.

It is the purpose of my invention to provide a device which will visualize to students of navigation these problems which do or may exist and also illustrate the means or manner of correcting such deviation.

With these and other objects in view the invention consists in certain novel features of construction, and combinations and arrangements of parts, as will be more fully hereinafter described and pointed out in the claims.

In the accompanying drawings—

Figure 1:
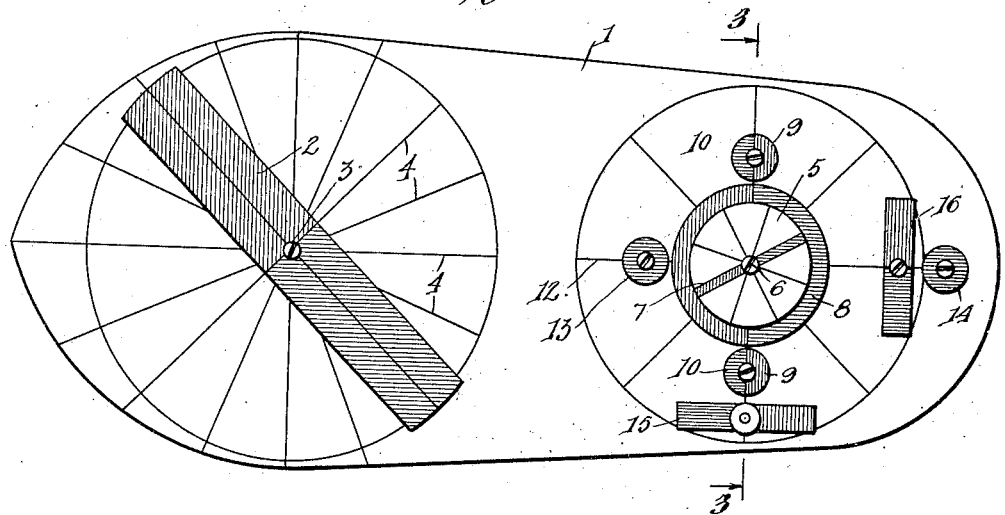
Figure 1 is a top plan view illustrating my improved device.

1 represents a plate or board which is shaped to represent the hull of a ship and on this plate or board 1 adjacent one end thereof an indicator 2 is mounted at its center to turn upon a screw or other suitable pivot 3. This indicator 2 is designed to indicate the line of magnetic force through the ship and is colored differently at its respective ends, indicating by the red color the north seeking point and the blue color the south seeking point.

To indicate the angle of deviation I provide a circular series of radial lines 4 extending from the center or axis 3 of the indicator 2 so that the teacher or instructor can place the indicator 2 at any known angle of deviation to illustrate any particular problem.

At the other end of the board or frame 1 a disk 5 has rotary mounting on a screw 6 or other pivotal support and on this disk 5 the representation of a compass needle 7 is indicated. This representation 7 is colored at its respective ends red and blue as indicated on the drawings. Under this disk 5 a second and larger disk 8 is mounted on the screw 6 and is of circular form divided into two halves colored respectively red and blue as indicated.

At opposite sides of the disks 5 and 8 a pair of relatively small disks 9 are mounted which represent the globes which are commonly employed in connection with ship compasses and these disks are divided into two halves colored red and blue respectively.

Figure 2:
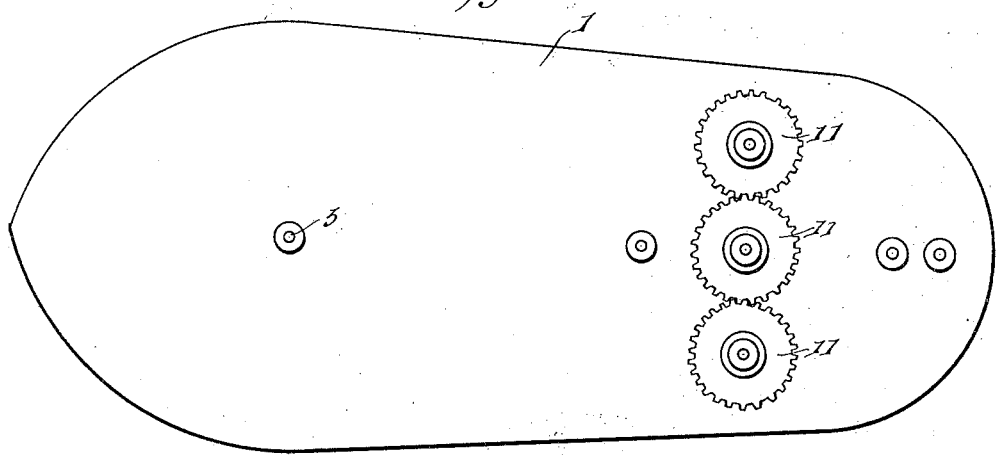
Fig. 2 is a bottom plan view.
Figure 3:
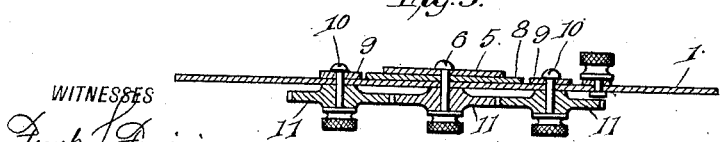
Fig. 3 is a view in section on the line 3—3 of Fig. 1.

As indicated in Fig. 2, the screw 6 and screws 10 supporting the disks 9 may be connected by a gear train 11 so as to compel the said disks to turn simultaneously, but the separate disks can be independently manipulated if desired.

An angle scale 12 is provided on the plate 1 which is concentric with the disks 5 and 8 to indicate the angle of deviation, and disks 13 and 14 are located in front and in rear of the disks 5 and 8 and indicate respectively the ordinary Flinders bar and the smoke stack of the ship. These disks 13 and 14 are both of a blue color.

The plate 1 also supports a pair of devices 15 and 16 which represent corrective magnets. The device 15 represents a fore-and-aft corrective magnet and the device 16 represents an athwartship corrector. These magnets are colored red and blue at their respective ends.

For convenience of description I shall hereinafter refer to the several parts by their ordinary names, although it is to be understood that the devices are, as a matter of fact, merely symbols and are used for teaching purposes. In order that the device may be more clearly understood, I shall now point out the problems as they exist and as indicated by my improved device and point out the manner of correcting compass deviation under such conditions.

The indicator 2 represents more specifically a sub-permanent magnetic axis which can be moved to any position to indicate the sub-permanent magnetic polarity. If, for example, the ship was built with her head end N. 45° west to the starboard bow, this shows that there is red polarity in the starboard bow and blue in the port quarter.

The usual problems which confront a navigator are as follows: When a ship is taken out to test the compass and make compensation for deviation thereof: In this case it is done by turning the compass north to the ship's head. It will then be indicated by the deviation of the compass that the red polarity in the starboard bow will deflect the north end of the compass needle to port and cause westerly deviation. This is compensated by placing an athwartship magnet, indicated at 16, with blue end to starboard. The ship is then swung with its head to the east, which movement is indicated by the compass disk 5, and it will be seen that the north end of the needle will be drawn toward the stern by the blue polarity there. This is compensated partly by a fore-and-aft magnet, indicated at 15, with blue end forward, but there is another correction to be made with the ship's head on east or west and that is the attractive force of inductive magnetism in vertical soft iron, as for example, the funnels, masts, and stanchions of the ship.

The disk 14 indicates the stack of the ship, but may, of course, indicate any of these other features or elements above referred to. In this case, the upper part of the stack or rudderstock is magnetized by induction with blue in the upper end and red in the lower end in the northern hemisphere. The red or north end of the compass needle is thus attracted to the smoke stack. This deflection is corrected by a vertical pillow of soft iron, known as a "Flinders bar" which is indicated in my device by the disk 13, and this Flinders bar is located on the forward side of the compass which has an attractive force to draw the needle back from the attraction of the stack.

Having swung the ship around, it will be seen that in this case with the ship's head on north and east, the deviation is westerly, and on south and west the deviation is easterly. Therefore, this deviation is known as "semicircular deviation."

Another deviation is known as "quadrantal deviation" which is caused from inductive magnetism in horizontal irons, such as beams and stringers. When the ship's head is placed on N.E. or S.W., in most cases the north point of the compass is drawn to the right, but when her head is pointing N.W. or S.E., the north point of the compass is drawn to the left.

In making this experiment, say for example, that the ship's head is on N.E., the disk 8 under the compass disk 5 is moved so it will coincide with the compass disk 5. The disks 9, representing the globes of the ship, are also red and blue and are positioned so as to coincide with the red and blue ends of the compass. If, in this position, the north point of the compass is drawn to the right, the globes, when placed toward the compass, will draw the needle back into proper position as the red inductive magnetism in half of the starboard globe will attract the blue end of the compass needle, likewise the blue in the port globe will attract the red end of the needle. This deviation is known by different names in adjacent quadrants.

Another problem which must be dealt with is what is known as "retentive magnetism". This is caused by steering in a course for any length of time, say, between New York and Europe. The port side of the ship will be charged with red and the starboard with blue polarity. When the ship is afterward turned to north, the compass instead of pointing north will point to the east of north. This will readily be seen from the deviascope, or rather indicated by my device by turning the disk 8 (which indicates transient inductive and retentive magnetism) so that the red is to starboard. The retentive magnetism disappears in a short time when the vessel is turned in the opposite direction.

I have indicated above, problems which confront the navigator and have pointed out some of these problems which may be indicated by my improved device, and which illustrates also the manner of correcting deviation of the compass from the several causes stated, and it is obvious that my improved invention is not intended as a device to actually correct deviation of a compass, but is an adjunct to the teacher in visualizing conditions which exist and the manner of correcting the same.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A device of the character stated, comprising a plate representing in plan the hull of a ship, means thereon for indicating the lines of magnetic force through a ship, and means on the plate for indicating the manner of correcting compass deviation due to such lines of indicated magnetic force.

2. A device of the character stated, comprising a support, means on said support indicating parts of a ship, means on said support indicating the compass, means on said support indicating compass deviation due to lines of magnetic force, and means on said support indicating the manner of correcting such deviation.

3. A device of the character described, comprising a plate representing in plan the hull of a ship, an indicator on said plate indicating the line of magnetic force, disks mounted on said plate and indicating respectively a ship's compass and globes at the sides thereof, a Flinders bar, a smoke stack, and other devices on said plate indicating corrective magnets for fore-and-aft and athwartship use.

4. A device of the character described, comprising a plate representing in plan the hull of a ship, an indicator on said plate indicating the line of magnetic force, disks mounted on said plate and indicating respectively a ship's compass and globes at the sides thereof, a Flinders bar, a smoke stack, other devices on said plate indicating corrective magnets for fore-and-aft and athwartship use, and a gear train operatively connecting the disks indicating the compass and the globes.

SOREN A. ELLINGS.